(12) United States Patent
Knudsen et al.

(10) Patent No.: US 7,720,809 B2
(45) Date of Patent: May 18, 2010

(54) APPLICATION INTEGRATION USING XML

(75) Inventors: Bardur Knudsen, Lyngby (DK); Per Reitzel, Virum (DK); Rajesh Veluswamy, Lyngby (DK)

(73) Assignee: Microsoft Corporation, Redmond, WA (US)

( * ) Notice: Subject to any disclaimer, the term of this patent is extended or adjusted under 35 U.S.C. 154(b) by 118 days.

(21) Appl. No.: 11/422,480

(22) Filed: Jun. 6, 2006

(65) Prior Publication Data
US 2007/0282866 A1 Dec. 6, 2007

(51) Int. Cl.
G06F 17/30 (2006.01)
(52) U.S. Cl. .................. 707/609; 707/692; 707/821; 707/944; 705/26; 705/27; 715/764
(58) Field of Classification Search ............. 707/104.1; 705/1–45; 715/700–866
See application file for complete search history.

(56) References Cited

U.S. PATENT DOCUMENTS

| | | | |
|---|---|---|---|
| 6,775,680 B2 * | 8/2004 | Ehrman et al. | 707/102 |
| 6,854,120 B1 * | 2/2005 | Lo et al. | 719/311 |
| 6,981,222 B2 | 12/2005 | Rush et al. | |
| 7,127,705 B2 * | 10/2006 | Christfort et al. | 717/113 |
| 7,257,820 B2 * | 8/2007 | Fischer et al. | 719/316 |
| 7,350,191 B1 * | 3/2008 | Kompella et al. | 717/108 |
| 7,359,909 B2 * | 4/2008 | Ponessa | 707/101 |
| 2002/0069081 A1 * | 6/2002 | Ingram et al. | 705/1 |
| 2003/0018661 A1 * | 1/2003 | Darugar | 707/500 |
| 2003/0120686 A1 | 6/2003 | Kim et al. | |
| 2003/0135825 A1 * | 7/2003 | Gertner et al. | 715/513 |
| 2004/0019602 A1 | 1/2004 | Williams et al. | |
| 2004/0044987 A1 * | 3/2004 | Kompalli et al. | 717/100 |
| 2004/0153968 A1 | 8/2004 | Ching et al. | |
| 2004/0205571 A1 * | 10/2004 | Adler et al. | 715/513 |
| 2004/0230550 A1 | 11/2004 | Simpson et al. | |
| 2005/0038779 A1 * | 2/2005 | Fernandez et al. | 707/3 |
| 2005/0050454 A1 * | 3/2005 | Jennery et al. | 715/513 |
| 2005/0055358 A1 | 3/2005 | Krishnaprasad et al. | |
| 2005/0144087 A1 * | 6/2005 | Huang et al. | 705/26 |
| 2005/0150953 A1 | 7/2005 | Alleshouse | |
| 2005/0160108 A1 | 7/2005 | Charlet et al. | |
| 2005/0160359 A1 * | 7/2005 | Falk et al. | 715/513 |
| 2005/0171980 A1 * | 8/2005 | Fernandez et al. | 707/200 |

(Continued)

OTHER PUBLICATIONS

Costall, R., "Back Office Integration Using ASP, COM, XML & MSMQ", Classic ASP library, published Mar. 14, 2001, http://www.asptoday.com/Content.aspx?id=718.

(Continued)

*Primary Examiner*—Tim T. Vo
*Assistant Examiner*—Michelle Owyang
(74) *Attorney, Agent, or Firm*—Westman, Champlin & Kelly, P.A.

(57) ABSTRACT

A method and system for integrating form data in an ERP system with a target application are provided. The method includes receiving a first input from a user of an ERP system while a form is running on an application layer of the ERP system to initiate a data integration process. Next, a metadata form XML file is generated at an ERP platform layer from the form running on the application layer. Then, the metadata form XML file is sent from the ERP platform layer to the application layer for use by target applications in integrating data from the form into the target applications.

17 Claims, 11 Drawing Sheets

U.S. PATENT DOCUMENTS

2005/0198100 A1 9/2005 Goring et al.
2005/0228808 A1* 10/2005 Mamou et al. .............. 707/100
2005/0251533 A1* 11/2005 Harken et al. ............ 707/104.1
2006/0036755 A1 2/2006 Abdullah et al.
2006/0112123 A1* 5/2006 Clark et al. ................. 707/101

OTHER PUBLICATIONS

"USoft Back Office Integration", Ness Product Information, Oct. 2005, http://www.ness.com/NR/rdonlyres/DB37BA65-1C70-40E2-9A6C-D059B3D02B71/4441/USoftBackOfficeIntegration__es.pdf.

"Integration", at least by Apr. 5, 2006, http://www.shopserver.biz/E-commerceSoftware__Modules__Integration.asp.

* cited by examiner

FIG. 3-3

```xml
<?xml version="1.0" encoding="UTF-8" standalone="no" ?>
- <Object type="Form" id="21" caption="01121212 Spotsmeyer's Furnishings - Customer Card"
  url="navision://client/run?servername=.%26database=Corsica%2028-03-
  06%26company=CRONUS%20International%20Ltd.%26target=Form%2021%26view=SORTING
  (Field1)%26position=Field1=0(01121212)%26servertype=MSSQL">
  - <Control type="TabControl" id="1" name="Control1">
    - <Control type="TabPage" id="0" name="" caption="General">
      - <Row>
        <Control type="Label" value="No." width="3300" id="3" name="Control3" />
        <Control type="TextBox" value="01121212" width="2750" id="2" name="No." />
        <Control type="Label" value="Search Name" width="3300" id="19" name="Control19" />
        <Control type="TextBox" value="SPOTSMEYER'S FURNISHINGS" width="2750" id="18"
          name="Search Name" />
      - <Row>
      - <Row>
        <Control type="Label" value="Name" width="3300" id="5" name="Control5" />
        <Control type="TextBox" value="Spotsmeyer's Furnishings" width="5500" id="4"
          name="Name" />
```

225

350

APPLICATION INTEGRATION USING XML

BACKGROUND

Enterprise resource planning (ERP) systems sometimes include a platform layer with no business logic, but which has its own integrated development environment (IDE) and runtime and database management system. The business logic ("application layer") can then be implemented as tables, forms, reports, code units ("function libraries") etc. on top of the ERP platform or platform layer. In order to allow ERP system partners and customers to customize the system to fit their needs, the partners and customers are often able to develop new modules or applications which integrate with the rest of the ERP system.

Often end users have some business data on the screen in their business application, typically as a form, which they want to manipulate in another program, for example a word processing program or a spreadsheet program. Since considerable customization of the ERP system may have taken place, it is difficult for the ERP system provider to foresee what the user will wish to export to another program. Therefore, typically, to use the business data in another application may have required custom code for specific forms.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

In some disclosed embodiments, methods of exporting data from a form in an ERP system to a desired application program are provided. The method includes a generic way to export data. Using some embodiments of the method, a metadata form XML file is generated at an ERP platform layer from a form running on the application layer. The metadata form XML file is sent from the ERP platform layer to the application layer for use by target applications in integrating data from the form into the target applications.

BRIEF DESCRIPTION OF THE DRAWINGS

FIG. 2-1 is a block diagram illustrating aspects of disclosed embodiments of ERP systems and methods.

FIG. 2-2 is a block diagram illustrating still further aspects of disclosed embodiments of ERP systems and method.

FIGS. 3-1 through 3-4 are representations of graphical user interfaces illustrating aspects of example embodiments.

FIG. 4 is a flow diagram illustrating some method embodiments.

FIGS. 5-1 through 5-5 are diagrams illustrating further aspects of some method embodiments.

DETAILED DESCRIPTION

In accordance with aspects of some disclosed embodiments, method of exporting data from a form in an ERP system to a desired application program is provided. The method includes a generic way to export such data, in the sense that it eliminates or reduces the need for the ERP system developer to have knowledge of what a user will want to export, as well as the need for custom code to be written to support such an export of data. It should be understood that the forms used to describe example embodiments can represent any of a wide variety of ERP business logic interfaces, for example including charts, tables, reports, function libraries, etc. The target applications to which the data is to be exported can be any of a wide variety of programs, but in exemplary embodiments include programs such as word processing programs, spreadsheet programs, database programs, email programs, etc.

Using the disclosed methods and systems, users of ERP systems can integrate data from a particular form they are viewing with a desired target application, with just the push of a button in some embodiments. For example, a user may be viewing a form showing charts of accounts for different fixed assets, but prefers to work with the accounts and numbers in a spreadsheet program. Using disclosed embodiments, the user can just push a button and have the spreadsheet launched and populated with the exact same information as he or she had on screen—even respecting the hiding/showing of columns and data filters. Further, if he or she wants some special spreadsheet to open, the user can select a specific stylesheet instead of the default stylesheet. For example, if the user wants the data shown in a pivot table, he or she can select a stylesheet that transforms the data into a pivot table, and the data from chart of accounts is automatically shown in a pivot table. The following discussion of example embodiments will further illustrate such capabilities.

Figure 1:
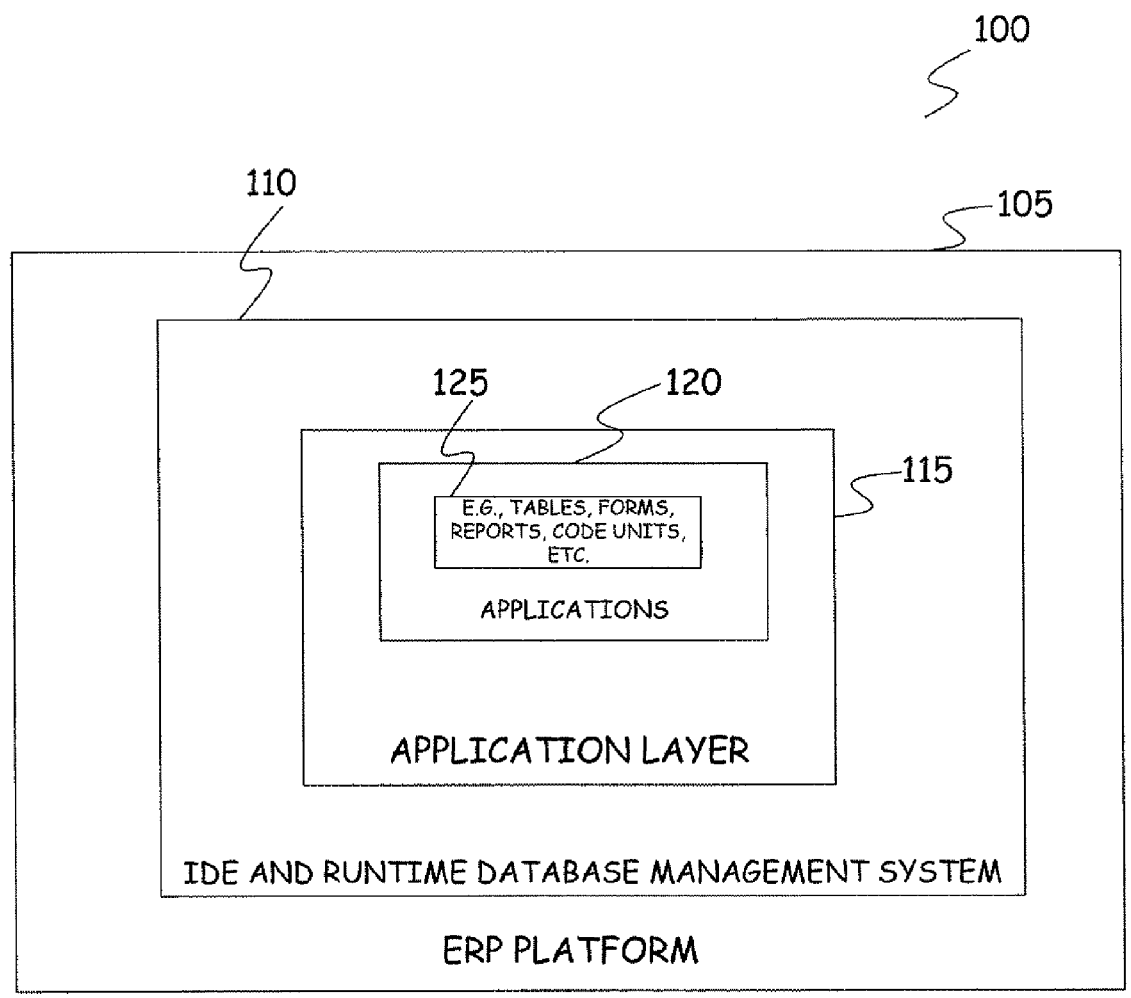
FIG. 1 illustrates an embodiment of an ERP system configured in accordance with disclosed embodiments.

Referring now to FIG. 1, shown is an ERP system 100 configured to implement some or all disclosed methods. ERP system 100 includes an ERP platform layer 105, which typically does not include business logic. In some embodiments, on top of the ERP platform or platform layer 105 is an IDE and runtime database management system 110. Also on top of the ERP platform layer 105 is an application layer which implements business logic, for example represented as applications 120. These applications 120 implement forms, such as tables, reports, code units, etc. (generally referred to as "forms 125").

Figures 1, 2:
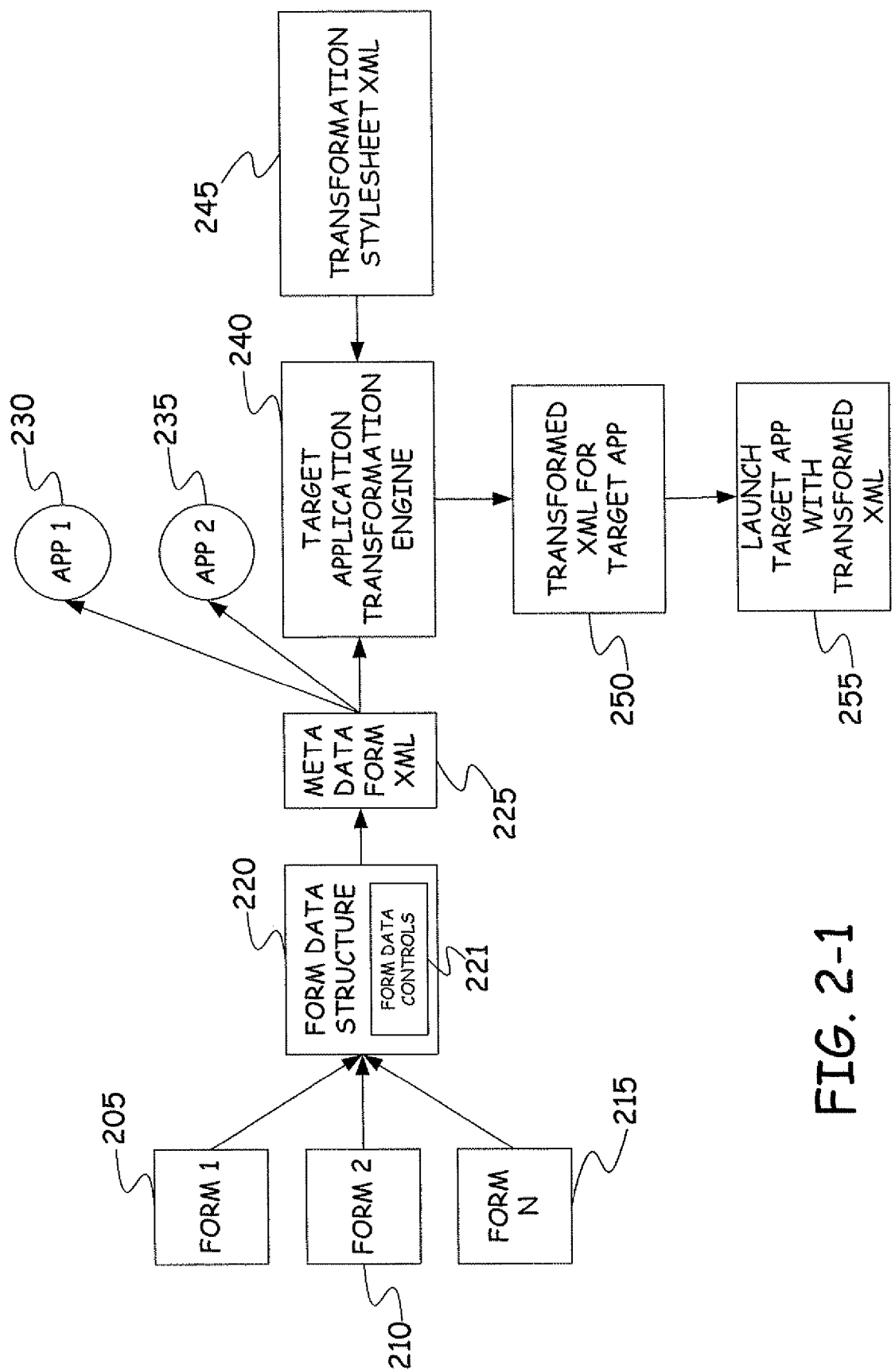
Figure 2:
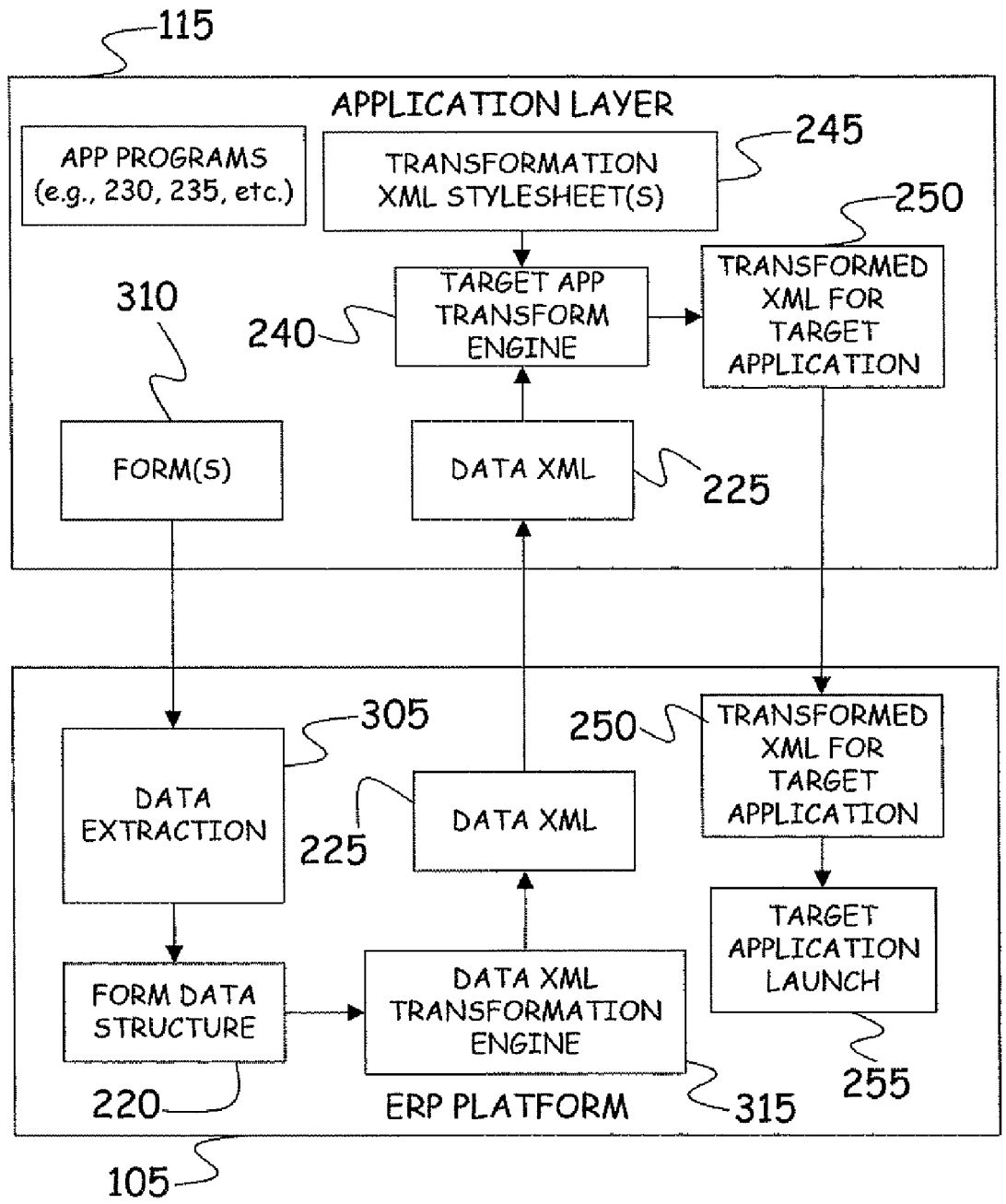

Referring now to FIGS. 2-1 and 2-2, shown is aspects of ERP systems and methods which integrate form data with a target application. FIG. 2-1 illustrates some components of the ERP system 100 and an example of the flow of data during an example method implementation. FIG. 2-2 illustrates these and other components of the ERP system 100, and visually separates method steps occurring at the ERP platform layer 105 and the application layer 115 in some example embodiments.

Figures 1, 3:
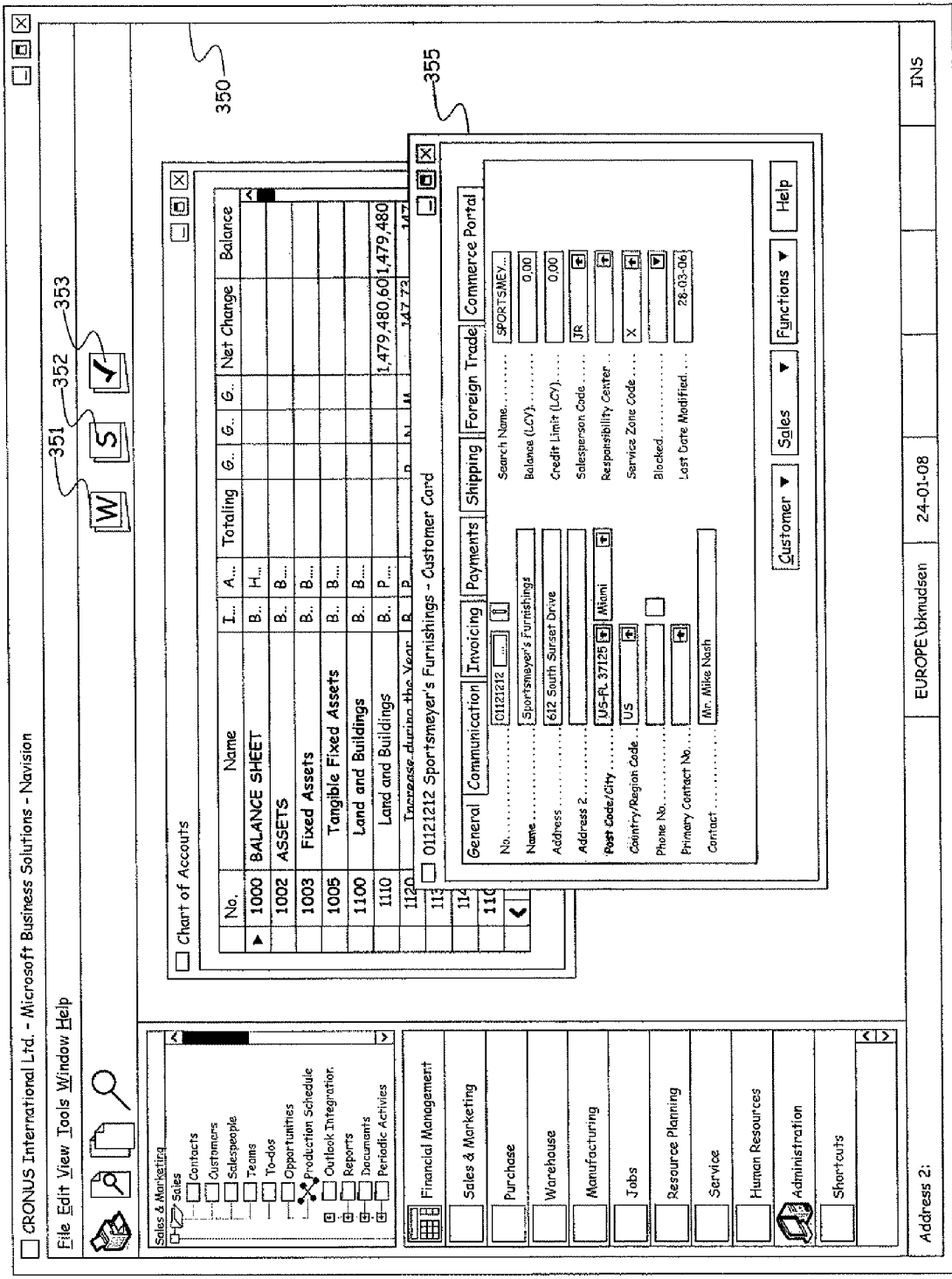
Figures 2, 3:
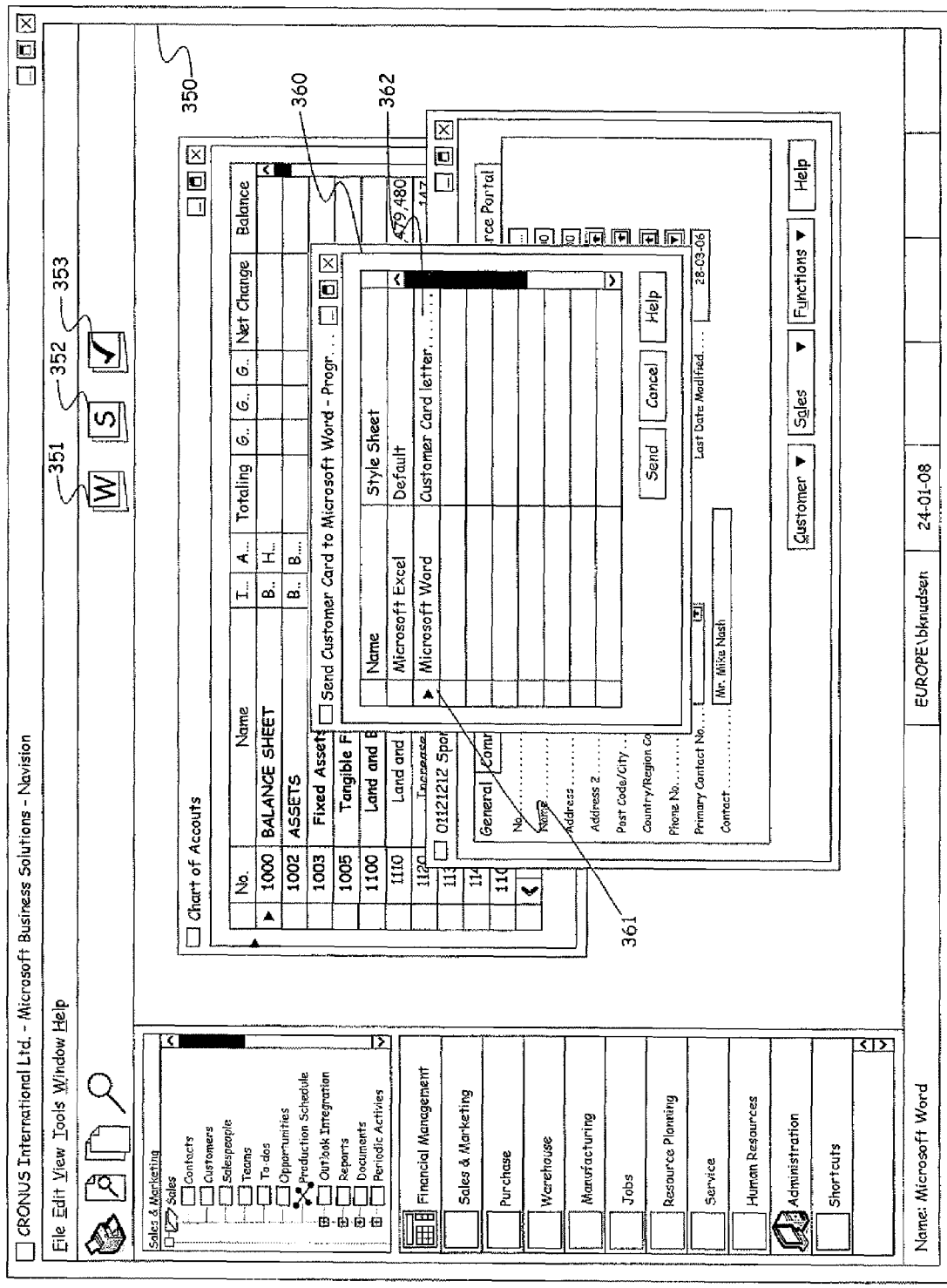

In FIG. 2-1, multiple forms are represented at 205, 210 and 215. One or more of these forms are represented generally in FIG. 2-2 at 310. One of these forms could be, for example, a list of Accounts for fixed assets that he or she would like to export to a spreadsheet program as a pivot table. In accordance with exemplary embodiments, the user can initiate such an integration operation by pressing a button in a toolbar of the graphical user interface. Examples of such toolbar buttons are represented in FIGS. 3-1 and 3-2, where buttons 351, 352 and 353 are shown on toolbar of graphical user interface (GUI) 350. FIGS. 3-1 and 3-2 are described further below following the discussion of FIGS. 2-1 and 2-2.

In response to the user initiating such a data integration operation, the ERP platform 105 extracts all the form data and structures them in a special form data structure 220 in memory. The form data structure is a linked list type of data structure containing the data from the form, as well as basic information about form data controls 221, in one example such as "Control ID", "Control Type", "Control Value", etc. In some embodiments, this extraction step is implemented using a data extraction component or module 305 of the ERP platform layer 105. This form data structure is then transformed into a data XML file format file 225. In an example embodiment, this transformation is implemented using a data XML transformation engine 315 on the ERP platform layer 105. This format is more structured and easily transformable by a transformation engine 240 implemented in the application layer 115.

After generating the metadata form XML 225, the ERP platform layer 105 sends this file to the application layer 115. From the application layer, different applications (represented at 230 and 235 in FIG. 2-1 can use the data XML file 225 for different purposes if desired. For example, the data XML file 225 can be used by a word processing program and by a spreadsheet program for different purposes. At the application layer, the target application transformation engine 240 transforms the data XML file, using a stylesheet (XSLT) 245 which can be selected or defaulted, as will be described later. The transformation results in a target application XML formatted file 250 suited for use by the target application. After transformation, the transformed XML file or document 250 is then sent back to the ERP platform layer, which launches the target application 255 with the XML document 250.

Figures 3, 4:
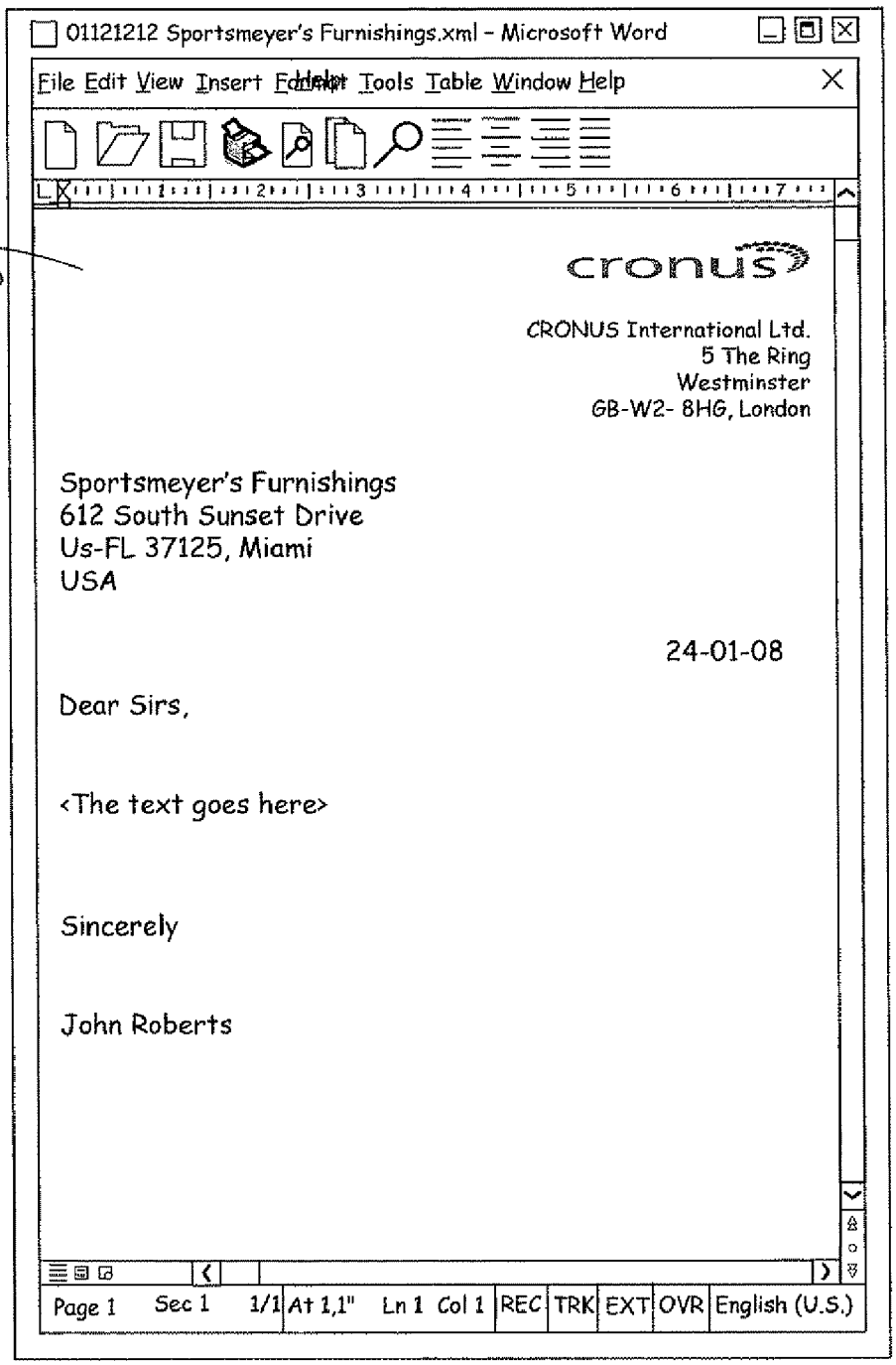
Figure 4:
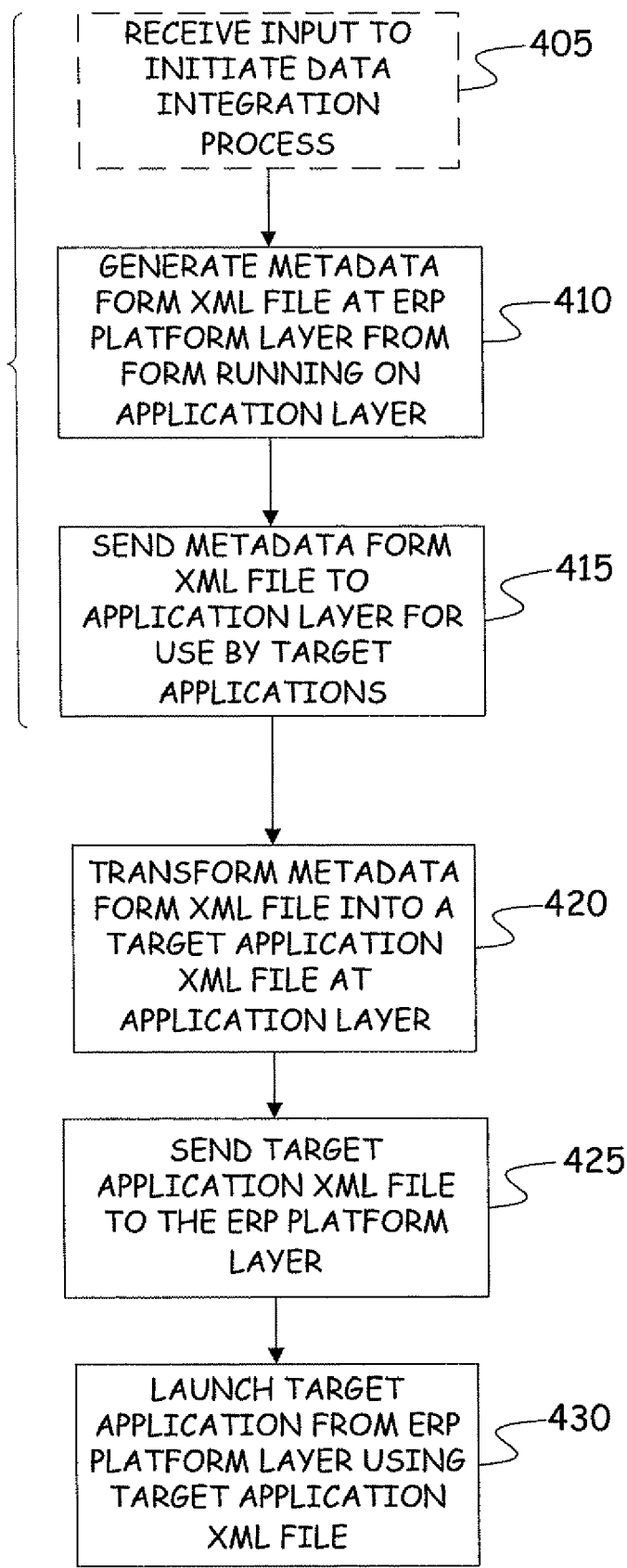

Referring now to FIGS. 3-1 through 3-4, an example scenario is illustrated in order to further demonstrate aspects of some disclosed embodiments. In FIG. 3-1, a GUI 350 is shown in which a "Customer Card" form 355 has focus. In order to export data from form 355, to one or more target programs, the user can press one of multiple buttons on a toolbar of the GUI. All three buttons initiate the process, but with potentially different target applications. In this example, a first button 351 results in the transformed form data being integrated with a word processing program, while a second button 352 results in the transformed form data being integrated with a spreadsheet program. Either of buttons 351 or 352 results, in one example embodiment, in the use of a default stylesheet for the particular target program. The third button 353 allows the user to select which stylesheet to use.

In this example, assume that the user selects the third button 353. This results in a dialogue box 360 being displayed on the GUI 350. The dialogue box 360 allows the user to select which target program to use, as well as which stylesheet for that target program. In this example, the user is presented with the option to use a spreadsheet program (e.g., Microsoft® Excel) or a word processing program (e.g., Microsoft® Word). It must be noted that this example is not limited to these particular programs, and that other target programs of similar or different types can be used as well. In this example, assume that the user selects Microsoft® Word at 361, along with a target application stylesheet 362, and presses send button 363.

At this point, the ERP platform layer components function as described above to collect all the field data, including captions and grouping, and produces a data XML document 225, which in a non-limiting example is illustrated in FIG. 3-3. The XML document 225 is sent to the business logic (application layer 115) in order to allow it to add extra information that is not directly part of the form data, e.g. company name, current date, user id etc. Then, the transformation using the selected stylesheet is performed by target application transformation engine 240, producing a target application compatible document or file 250. The target application launches from the ERP platform layer 105 with the transformed XML document 250. An example of the resulting displayed document 370 in the target application is illustrated in FIG. 3-4. There, the data can be manipulated as desired by the user.

Referring now to FIG. 4, shown are steps of various method embodiments for integrating form data with a target application. As shown at step 410, an embodiment of the method includes generating a metadata form XML file at an ERP platform layer from a form running on an application layer. Then, at step 415, the metadata form XML file is sent to the application layer. Here, the metadata form XML file (225 in FIGS. 2-1 and 2-2 can be used by various application.

Figures 1, 5:
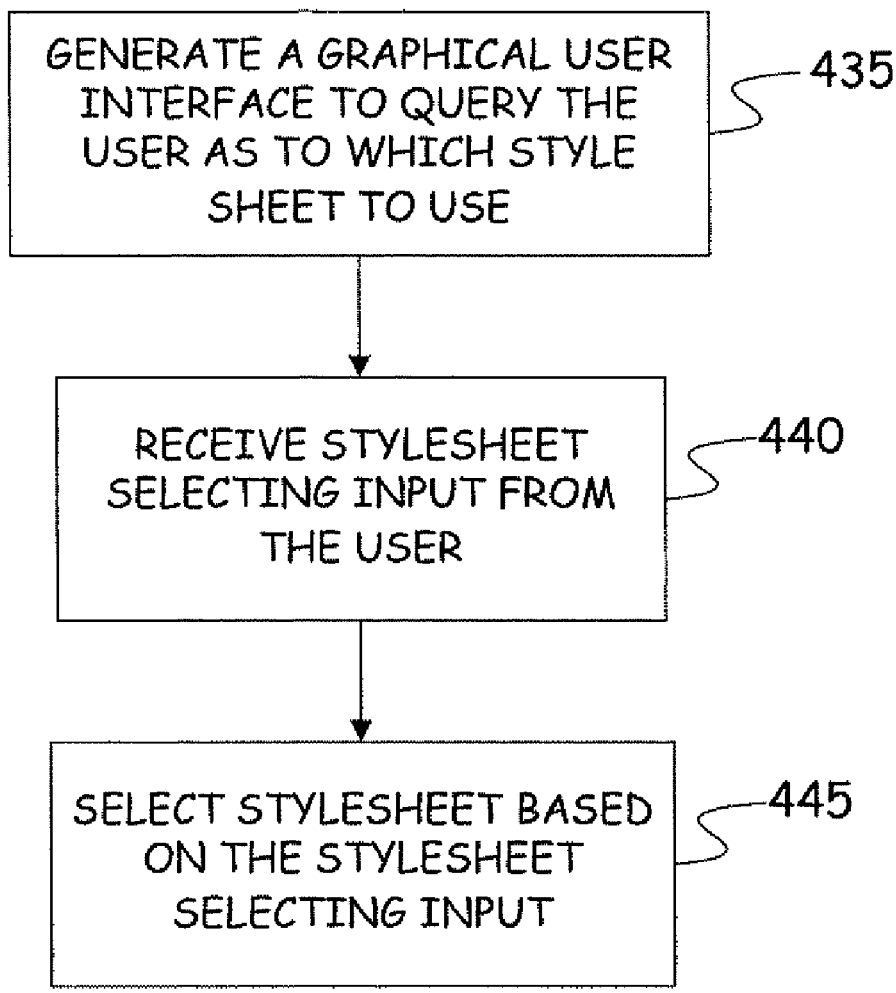
Figures 2, 5:
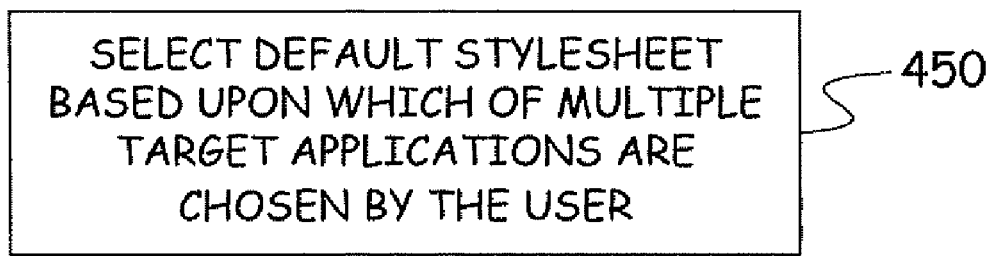
Figures 3, 5:
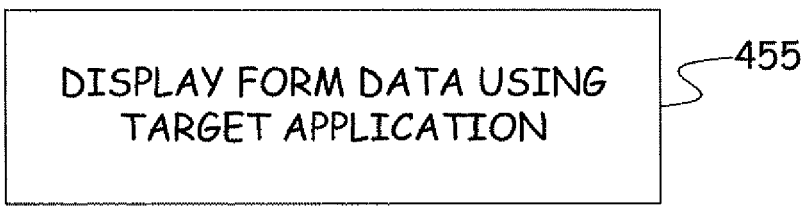
Figures 4, 5:
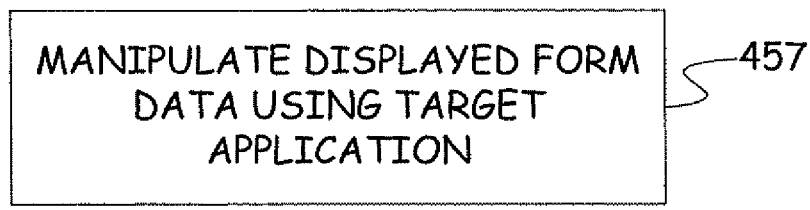
Figure 5:
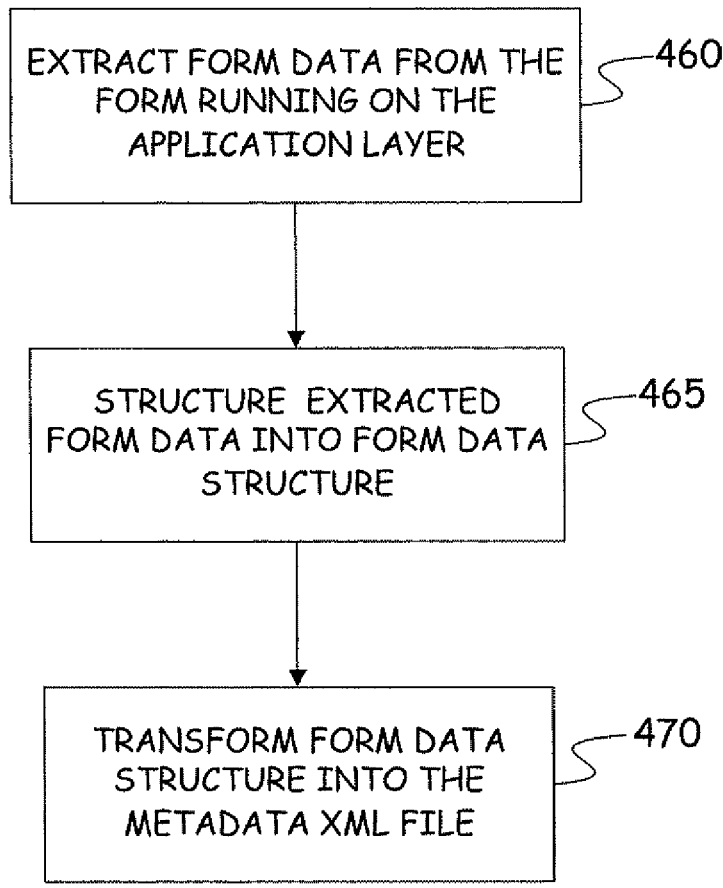

In some embodiments, the method includes further steps. As illustrated in FIG. 4, at step 420, the metadata form XML file is transformed into a target application XML file 250 at the application layer using a target application transformation engine 240 and a first stylesheet 245. At step 425, this target application XML file is sent to the ERP platform layer 105, which launches the target application, as shown at step 430, to provide integrated form data with the target application. Referring to FIGS. 5-3 and 5-4, in some embodiments the method includes steps 455 and 457 of displaying or otherwise manipulating the form data using the target application.

Referring to FIG. 5-5, in some embodiments the step 410 of generating the metadata form XML file at the ERP platform layer further includes the steps 460, 465 and 470. At step 460, the form data is extracted from the form running on the application layer. At step 465, the extracted form data is structured into a form data structure in memory of the ERP platform layer. Then, at step 470, the form data structure in memory of the ERP platform layer is transformed into the metadata XML file.

Referring now to FIG. 5-1, in some embodiments, before the step of transforming 420 the metadata XML file 225 into the target application XML file 250, the method further includes selecting steps 435, 440 and 445. At step 435, a GUI is generated to query the user as to which style sheet to use. At step 440, an input from the user is received to select a stylesheet. At step 445, the stylesheet is selected based on the input.

Referring to FIG. 5-2, in some embodiments, the method includes step 450 of automatically selecting a default stylesheet as the first stylesheet based upon which of multiple target applications are chosen during the initiating step.

Figure 6:
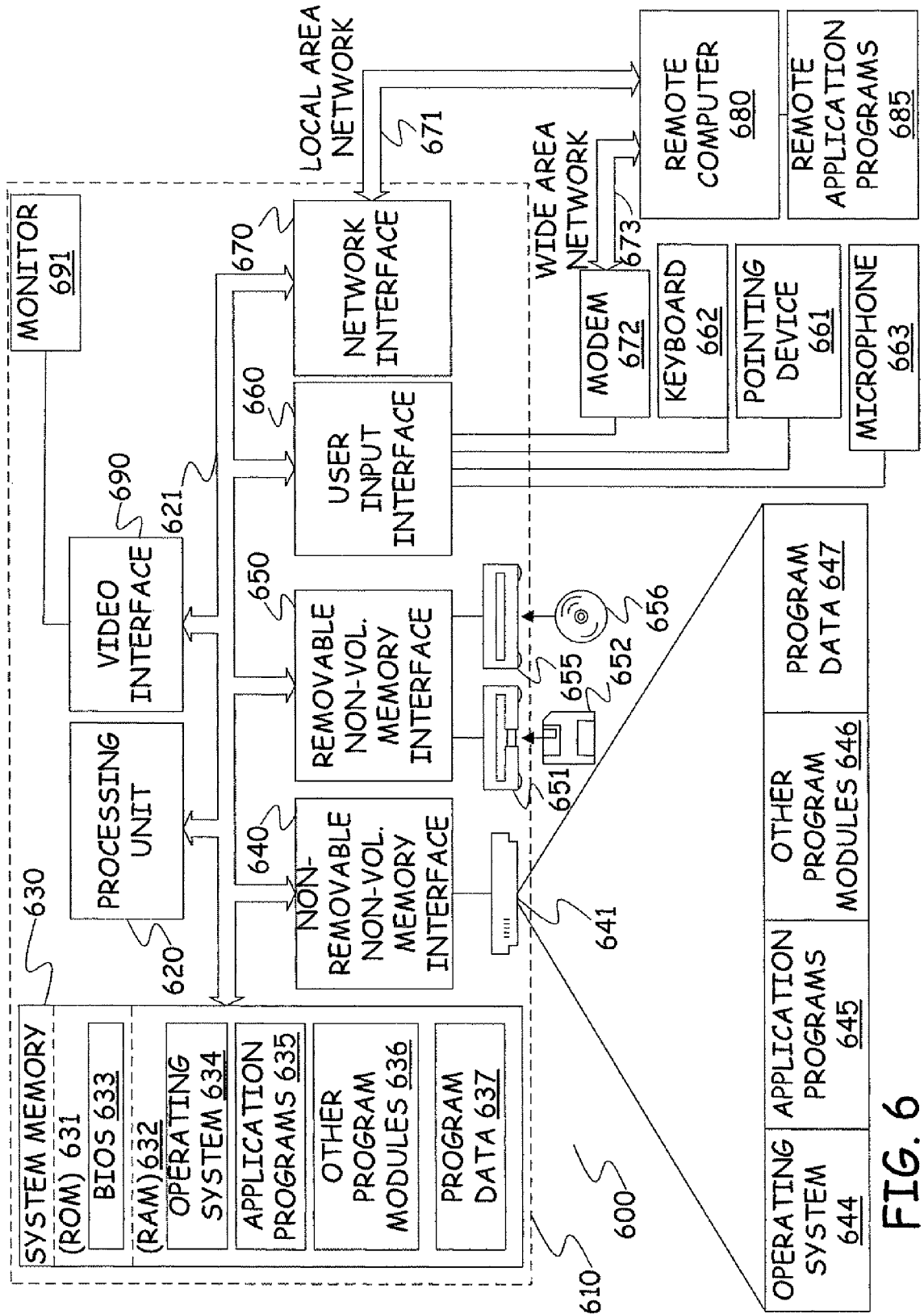
FIG. 6 is a diagram illustrating a general computing environment configured to implement disclosed embodiments.

With reference to FIG. 6, an exemplary system includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 600.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way o example, and not limitation, FIG. 6 illustrates operating system 634, application programs 635, other program modules 636, and program data 637.

The computer 610 may also include other removable/non-removable volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user may enter commands and information into the computer 610 through input devices such as a keyboard 662, a microphone 663, and a pointing device 661, such as a mouse, trackball or touch pad. Other input devices (not shown) may include a scanner or the like. These and other input devices are often connected to the processing unit 620 through a user input interface 660 that is coupled to the system bus, but may be connected by other interface and bus structures, such as a parallel port or a universal serial bus (USB). A monitor 691 or other type of display device is also connected to the system bus 621 via an interface, such as a video interface 690.

The computer 610 may operate in a networked environment using logical connections to one or more remote computers, such as a remote computer 680. The remote computer 680 may be a personal computer, a hand-held device, a server, a router, a network PC, a peer device or other common network node, and typically includes many or all of the elements described above relative to the computer 610. The logical connections depicted in FIG. 6 include a locale area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user-input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on remote computer 680. It will be appreciated that the network connections shown are exemplary and other means of establishing a communications link between the computers may be used.

It should be noted that the concepts herein described can be carried out on a computer system such as that described with respect to FIG. 6, and FIG. 6 should be interpreted as being configured to carry out one or more of these various concepts. However, other suitable systems include a server, a computer devoted to message handling, or on a distributed system in which different portions of the concepts are carried out on different parts of the distributed computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer storage medium having stored thereon computer-executable instructions for implementing steps of a method comprising:

receiving a first input from a user of an enterprise resource planning (ERP) system while a form is running on an application layer of the ERP system to select one of a plurality of target applications and to initiate a data integration process, the application layer running on top of an ERP platform layer in the ERP system, the first input being received through a button in a toolbar of a graphical user interface of the ERP system, the plurality of target applications including a word processing program, a spreadsheet program, a database program, and an email program;

generating a metadata form XML file at the ERP platform layer from the form running on the application layer, the metadata form XML file being a linked list data structure having data from the form and information about controls from the form;

sending the metadata form XML file from the ERP platform layer to the application layer for use by the selected target application in integrating data from the form into the selected target application;

automatically selecting a default stylesheet as a first stylesheet based upon which one of the plurality of target applications is selected by the user with the first input;

transforming the metadata form XML file into a target application XML file using a target application transformation engine and the first stylesheet at the application layer, the target application XML file being in a format that is compatible with the target application, the target application transformation engine being implemented within the application layer;

sending the target application XML file to the ERP platform layer;

launching the selected target application from the ERP platform layer using the target application XML file to provide integrated form data with the target application; and manipulating the integrated form data utilizing the target application.

2. The computer storage medium of claim 1, wherein the toolbar of the graphical user interface has a plurality of buttons, each button initiating the data from the form to be exported, and each button corresponding to a different target application.

3. The computer storage medium of claim 2, wherein the data from the form includes information from a plurality of fields, wherein at least one of the plurality of fields includes a dropdown list, wherein at least a second one of the plurality of fields includes numerical data, and wherein at least a third one of the plurality of fields includes textual data, and wherein the method further comprises displaying the integrated form data using the selected target application.

4. The computer storage medium of claim 3, wherein the information about the controls from the form includes a control ID, a control type, and a control value, and wherein the step of generating the metadata form XML file at the ERP platform layer further comprises:

extracting the form data from the form running on the application layer;

structuring the extracted form data into a form data structure in memory of the ERP platform layer; and transforming the form data structure in memory of the ERP platform layer into the metadata XML file.

5. A computer-implemented method of integrating form data in an enterprise resource planning (ERP) system with a target application, the method comprising:

displaying a graphical user interface along with a form running on an application layer, the graphical user interface including a plurality of different input controls, the plurality of different input controls including a first button, a second button, and a third button, the first button corresponding to integrating the form data with a word processing program, the second button corresponding to integrating the form data with a spreadsheet program, and the third button corresponding to a dialogue box that enables a user to select the target application from a plurality of possible target programs and to select a stylesheet for the target application, the dialogue box and the form being displayed in separate windows within the graphical user interface;

selecting an input control, from the plurality of different input controls displayed on the graphical user interface along with the form running on the application layer, to select the target application and to initiate a generating step;

in response to initiation of the generating step, generating a metadata form XML file at an ERP platform layer from the form running on the application layer, the metadata form XML file comprising all field data from the form including captions and groupings;

sending the metadata form XML file to the application layer;

transforming the metadata form XML file into a target application XML file for the target application at the application layer using a target application transformation engine and a first stylesheet, the first stylesheet having been selected by the user utilizing the dialogue box;

sending the target application XML file to the ERP platform layer;

launching the selected target application from the ERP platform layer using the target application XML file to provide the integrated form data with the target application;

displaying the integrated form data in the target application; and manipulating the integrated form data utilizing the target application.

6. The computer-implemented method of claim 5, wherein the plurality of different input controls are displayed in a toolbar of the graphical user interface, and wherein each of the plurality of different input controls has a graphical icon.

7. The computer-implemented method of claim 6, wherein the ERP system includes a plurality of different types of forms, the different types of forms including charts, tables, reports, and function libraries.

8. The computer-implemented method of claim 5, wherein the plurality of possible target programs include a word processing program, a spreadsheet program, a database program, and an email program, and wherein generating the metadata form XML file at the ERP platform layer further comprises:

extracting the form data from the form running on the application layer;

structuring the extracted form data into a form data structure in memory of the ERP platform layer; and transforming the form data structure in memory of the ERP platform layer into the metadata XML file.

9. The computer-implemented method of claim 8, wherein the first stylesheet is a pivot table, and wherein the steps of extracting the form data from the form and structuring the extracted form data into the form data structure further comprises:

extracting the form data from the form and structuring the extracted form data into the form data structure using a data extraction component running on the ERP platform layer, the ERP platform layer having a runtime database management system and business logic, the business logic implementing the form.

10. The computer-implemented method of claim 8, wherein structuring the extracted form data into the form data structure in memory of the ERP platform layer further comprises structuring the extracted form data into the form data structure such that the form data structure contains information about form data controls, the information about form data controls including a control ID, a control type, and a control value.

11. The computer-implemented method of claim 5, wherein the dialogue box has two columns, a first of the two columns supporting selection of an application and the second of the two columns supporting selection of a stylesheet.

12. The computer-implemented method of claim 5, and further comprising:

adding extra information to the metadata form XML file at the application layer, the extra information including information that is not directly part of data from the form.

13. An enterprise resource planning (ERP) system comprising:

a processing unit and computer storage medium of an ERP system computer, the computer storage medium having stored thereon computer-executable instructions which configure the processing unit of the ERP system computer to implement ERP system components comprising:

an ERP platform layer;

an application layer running on top of the ERP platform layer;

an integrated development environment and runtime database management system on top of the ERP platform layer;

an application running on the application layer which implements a form on the application layer, the form having a plurality of different selectable input controls each corresponding to a different one of a plurality of target applications, wherein each of the selectable input controls is configured such that when selected, the selected input control selects the corresponding one of the plurality of target applications and initiates data extraction;

a dialogue box that displays a plurality of possible target applications for exporting data to and a plurality of possible stylesheets to use with the plurality of possible target applications;

a data extraction component configured to extract form data from the form running on the application layer of the ERP system in response to selection of the input control on the form, and to structure the extracted form data into a form data structure in memory of an ERP platform layer;

a data XML transformation engine configured to transform the form data structure in the memory of the ERP platform layer into a metadata XML file, the metadata XML file having a plurality of data fields and corresponding data field identifiers, the data fields including an object type field, an id field, and a caption field; and wherein the ERP platform layer is configured to send the metadata XML file to the application layer for use by the selected target application.

14. The ERP system of claim 13, wherein the ERP system components which the processing unit is configured to implement further comprise a target application transformation engine running on the application layer and configured to use a first stylesheet to transform the metadata XML file into a target application XML file at the application layer, and wherein the metadata XML file further has a plurality of row sections, each row section including a control type field, a value field, a width field, and a name field, each row section further including textual information corresponding to its control type field and numerical information corresponding to its width field.

15. The ERP system of claim 14, wherein the ERP application layer is configured to send the target application XML file to the ERP platform layer for launching of the selected target application to provide integrated form data with the target application, and wherein the dialogue box includes a plurality of boxes that are arranged in rows and columns, a first one of the columns including information about the plurality of possible target applications, a second one of the columns including information about the plurality of possible stylesheets, and a third one of the columns enabling a user to make a selection.

16. The ERP system of claim 15, wherein the first stylesheet is chosen from the plurality of possible stylesheets, and wherein the dialogue box further includes a send button, a cancel button, a help button, and a header, the header being located at a top of the dialogue box and including textual information that describes the dialogue box.

17. The ERP system of claim 16, wherein the data extraction component runs on the ERP platform layer, and wherein the selected target application displays a document, the document including information from the metadata XML file and information from the application layer, the information from the application layer including a company name, a current date, and a user id.

* * * * *